Oct. 4, 1966 L. E. KILMARX 3,276,503
TIRE PRESSURE MAINTENANCE SYSTEM
Filed Jan. 21, 1965 3 Sheets-Sheet 1
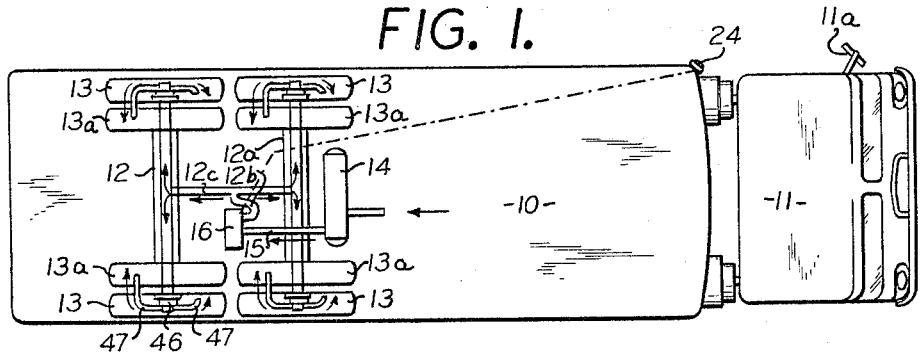
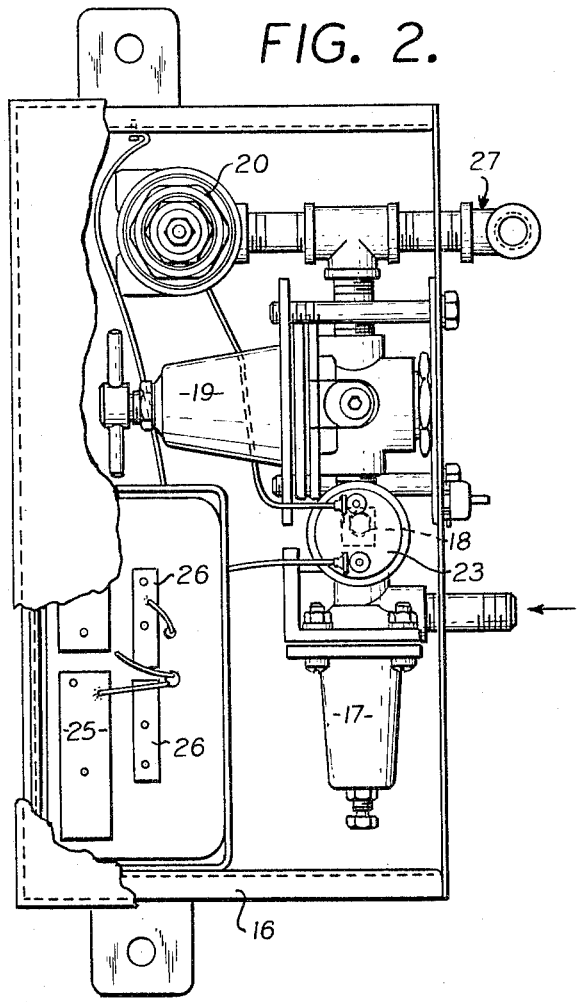
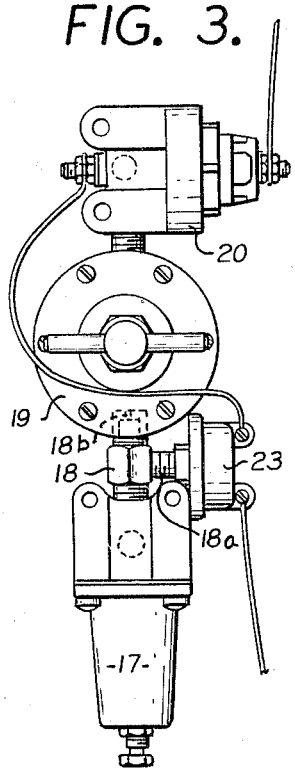
INVENTOR
LOUIS E. KILMARX
BY
Byerly, Townsend, Watson + Churchill
ATTORNEYS.

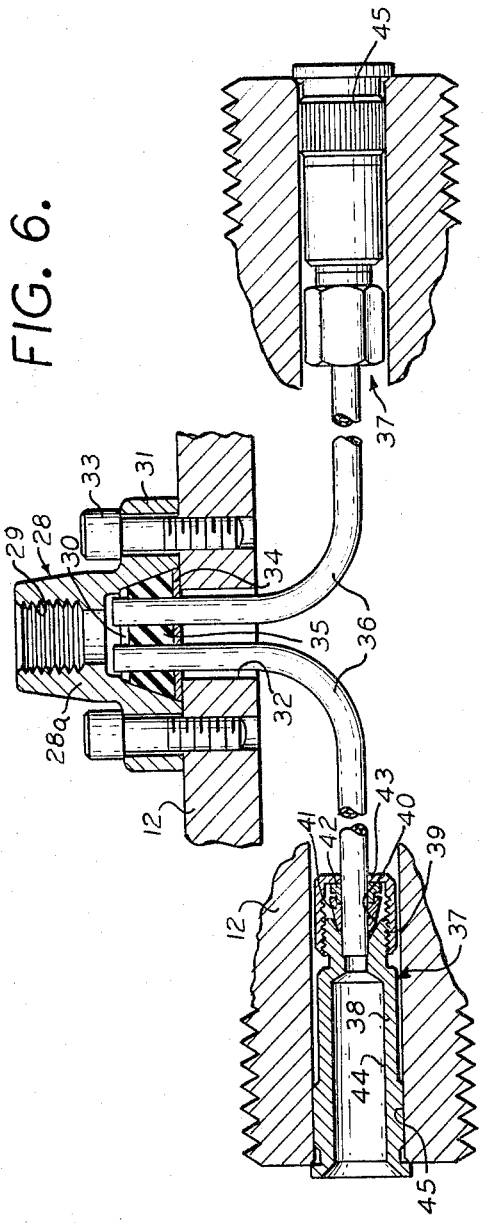

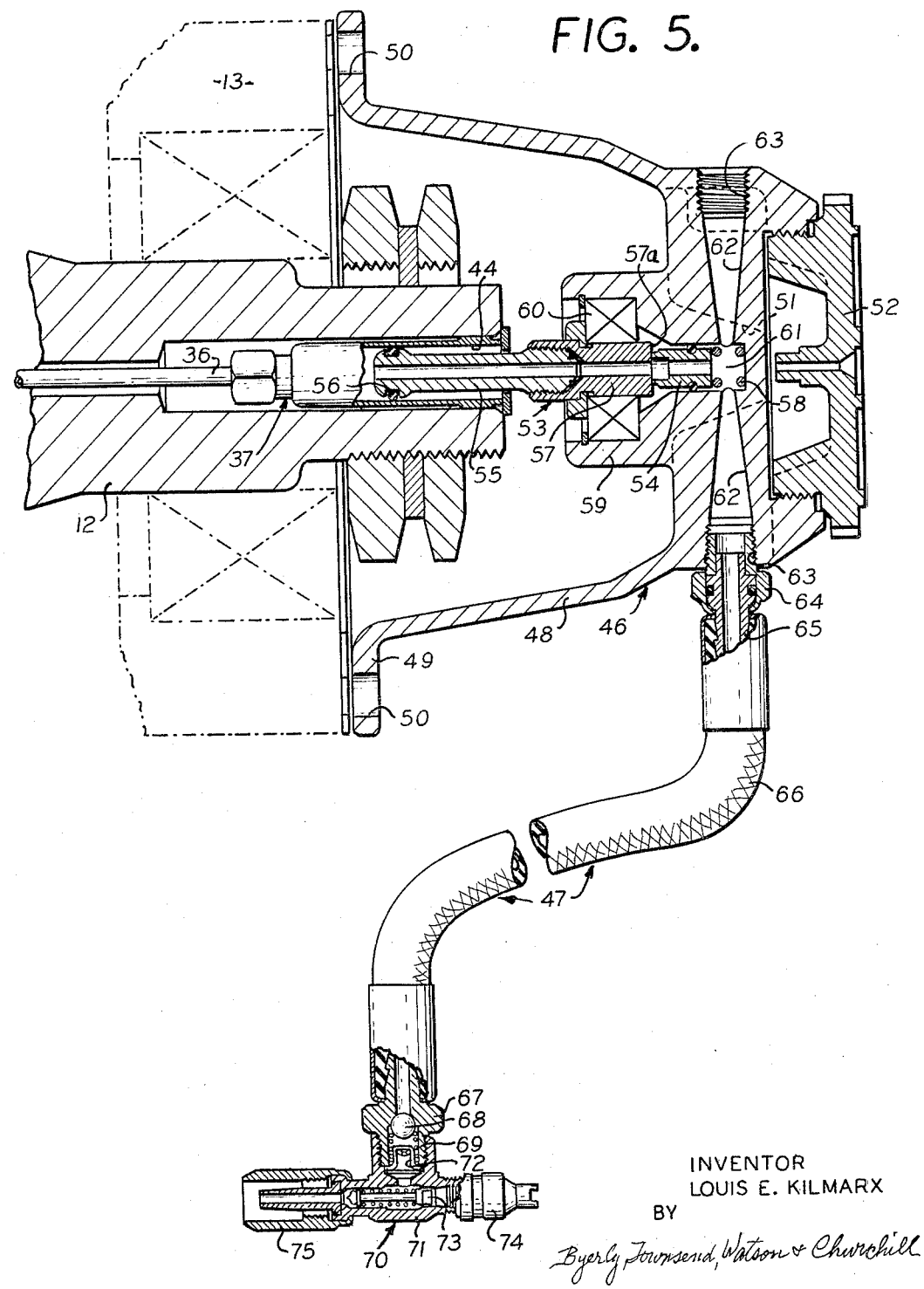

3,276,503
TIRE PRESSURE MAINTENANCE SYSTEM
Louis E. Kilmarx, Massapequa Park, N.Y., assignor to Scovill Manufacturing Company, Waterbury, Conn., a corporation of Connecticut
Filed Jan. 21, 1965, Ser. No. 426,927
14 Claims. (Cl. 152—417)

The present invention relates to a tire pressure maintenance system and aims to provide certain improvements therein.

The idea of putting air into a rotating tire is not new. Such systems employed a rotating joint at each hub and included a dial gauge on the dashboard showing pressure in each tire. Air could also be added and removed from the tires while the vehicle was in motion. Each tire had an independent system and they were not interconnected. This system was developed and used on the United States Army DUKW vehicles during World War II and was made up of a rotating joint at each wheel, a pipe manifold with manual shut-off valves, a manual inflate valve, a dial gauge and a manual deflate or dump valve to lower the pressure in any of the tires.

Since World War II, rotating joints have been perfected to where they are almost as dependable as tires and have been run for thousands of miles without leakage. The valving has become quite sophisticated and operation requires virtually no driver attention. One knob is the only control, along with a duplex gauge showing both actual tire pressure and desired tire pressure. The knob is turned in one direction until the desired pressure shows on one hand of the gauge. This is an instantaneous reaction. Tires will all rapidly inflate to this pressure, the air flow will automatically stop. Should a leak develop in any tire, pressure will automatically be maintained, providing the leak does not exceed air supply. To lower tire pressures, the knob mentioned is turned in the opposite direction whereupon the same sequence of events occur but the tire pressures drop instead of rise. The basic system used on the Army DUKW with various modifications have been installed on a variety of vehicles but commercial attempts to sell such systems and tire alarm devices associated therewith have not proved profitable. Moreover, such prior systems are not readily compatible with trailers used by truckers, as installations of conduits and electrical connections from the trailer to the tractor are most impracticable. However, with the tremendous increase in the use of trailers, truckers have become tire pressure conscious and are aware that low pressure in a trailer dual tire is hard for the driver to "feel" and also quite dangerous.

Accordingly, the present invention has among its objects the following:

(a) To eliminate routine servicing of trailer tires whereby the man hours spent checking tire pressures and "topping up" are saved since this servicing is done automatically;

(b) To insure increased tire mileage through proper pressure in all tires since by operating all tires at the pressure set for the trailer, not a single tire runs at a lower pressure for the minimum set for the whole trailer;

(c) To reduce roadside delays, as the delay and expense of enroute flats will be greatly reduced;

(d) To warn the driver of low tire pressure as leaks must be large to obtain operation of the tire alarm and thereby the driver will be warned of this serious leak and stop before damage is done;

(e) To warn the driver of a hot bearing or loose wheel by use of various instrumentalities which will be hereinafter explained;

(f) To reduce to a minimum fire hazard and highway accidents caused by continued running of underinflated or flat tires;

(g) To provide increased fuel mileage which is concomitant with proper tire inflation.

In addition to the foregoing objects, the present invention will serve to improve time schedules, lower insurance rates, provide better customer relations, avoid accidents because of less roadside stops, reduce administrative costs, reduce maintenance costs and also reduce tire bank inventories and locations for tire replacements.

The foregoing and other objects of the invention, not specifically enumerated, are accomplished by using many of the same components as heretofore employed in running inflation systems, but in much simplified manner so that a control of trailer tire pressures is rendered completely automatic. The tire pressure maintenance system, hereinafter referred to for simplicity as T.P.M.S., utilizes compressed air available in excess of brake system safety requirements, is self-contained and requires no additional hose or electrical connections between the trailer and the tractor. Combined in this system is also the feature of a low pressure tire alarm. The T.P.M.S. of the present invention will add lost air to any underinflated tires; it will maintain air in tires with slow leaks and will warn the driver of a tire blow-out or a dangerous leak. It will also warn of hot or loose wheel bearings.

T.P.M.S. is designed for maintenance free operation and is constructed for maximum efficiency. A special protective valve prevents bleeding the air brake tank below the required safe level. All tires operate independently of each other so a pressure loss in one tire does not vary the pressure in any of the other tires. In the unlikely event a hub-tire valve hose (wheel hose) should be damaged or cut by sharp stones or rocks while on the road, all tires on the trailer will continue to perform normally without danger of any loss of air through the use of individual check units in each assembly at the tire valve mouth.

The invention may be said to consist of five basic units; namely, a control box, a warning light installation, an axle hose assembly, a rotating seal hub cap and a wheel hose assembly; all arranged in a novel combination to accomplish the foregoing enumerated objects of the invention.

For a more comprehensive understanding of the invention, reference will now be made to the detailed description which follows, in conjunction with the accompanying drawings showing a preferred embodiment, wherein:

FIG. 1 is a diagrammatic plan view of an installation of the invention on a dual-wheel, tandem-axle trailer;

FIG. 2 is a front elevation of the control box with its contained parts constituting an essential unit of the T.P.M.S.;

FIG. 3 is a top plan view of the contained parts in the control box;

FIG. 4 is a schematic showing the relationship of parts in the installation shown on FIG. 1;

FIG. 5 is a sectional view, partly in elevation, of the rotating seal hub cap and one wheel hose assembly;

FIG. 6 shows a detail view, partly in elevation and partly in section, of the axle tube fitting assembly.

Referring to the drawings in the various figures of which like reference characters represent corresponding parts, the invention is illustrated as applied to a trailer 10 adapted to be drawn by a tractor 11 to which the trailer may be connected in any conventional manner. The tractor as is conventional is equipped with a rear-view mirror 11a. More specifically, the trailer as shown is equipped with a pair of tandem normally hollow axles 12, 12a on the ends of each of which are mounted for free rotation thereon a pair of dual wheels 13, 13a each adapted to have mounted thereon in turn a pneumatic tire (not shown) with its valve stem projected inwardly through the rim of the wheel. Mounted on the underframe of the trailer is an emergency air brake tank 14 adapted to receive air under super atmospheric pressure from a source (not shown) carried by the tractor. A hose or tube 15 leads from the tank 14 to a control box 16 also mounted on the underframe of the trailer, which control box contains the essential control devices of the tire pressure maintenance system (T.P.M.S.).

Carried by or mounted within the control box and connected by suitable fittings or hardware from the tank 14 to the axles 12, 12a are the following devices: a pressure protection valve 17, an adapter 18, a pressure regulator 19 and a normally closed pressure operated switch 20 i.e., a switch which closes when fluid pressure acting thereon is below a predetermined minimum pressure. Optionally, an airline filter 21 may be connected between the emergency air brake tank 14 and the pressure protection valve 17, and also optionally a shut off valve 22 may be connected between the pressure switch 20 and the axles 12, 12a by an axle hose assembly 12b, 12c, or anywhere downstream of the air flow. The adapter 18 has an intermediate branch 18a leading to a normally open pressure operated switch 23 and an outlet with a restricted opening 18b, the function of which will be hereinafter explained. A normally open pressure switch is one which remains open until a predetermined fluid pressure in excess of atmospheric pressure acts thereon. The pressure switches 20 and 23 are electrically connected together with and to a warning means herein shown as flashing light 24 and to a transistorized flasher unit 25 and batteries 26. The electrical wiring arrangement for the pressure switches 20 and 23, the flashing light 24, the transistorized flasher unit 25 and the batteries 26 are shown in FIG. 4. The devices 17 to 26 per se as well as the hardware by which said devices are connected, with the exception of the adapter 18, are commercial items and detailed description thereof is not thought necessary.

Referring now to FIGS. 1, 2, 4 and 6, the axle hose assembly 12b, 12c is connected at one end to the downstream outlet T fitting 27 (FIG. 2) protruding from the control box and at its other end to axle tube fittings 28 (FIGS. 4 and 6). Each fitting 28 consists of a tubular body member 28a having at one end an internal threaded bore 29 which at its inner end leads to an open socket 30 and at the other end of the fitting whereat the body is formed with an outwardly extending flange 31 for attachment to an axle 12 in overlying relation to an opening 32 therein by fastening means 33. Held within the socket 30 in overlying relation to the hole 32 in the axle is a washer 34 which has a pair of spaced holes therein and overlying the washer is an elastomeric grommet 35 which has a pair of holes therethrough in alinement with the holes in the washer and through which holes the free ends of a pair of plastic tubes 36 which are mounted in the hollow axle extend into the socket 30. A fluid tight seal is accomplished by the compression of the elastomeric grommet 35 when the fastening means 33 are tightened. The opposite end of each plastic tube is connected to an axle tube mounting unit 37 consisting of a tubular bushing 38 which at its inner end is externally threaded as indicated at 39 and internally tapered as shown at 40 and provided with a front ferrule 41 and a rear ferrule 42 and a cap nut 43 for locking said end of the plastic tube within the tubular bushing 38. The tubular bushing 38 at its outer end has a uniform internal bore 44 and is slightly enlarged and milled on its exterior as shown at 45 and designed to be force fitted into the outer end of the hollow axle 12. The tube mounting unit 37 is fitted within the axial bored end of a typical solid end axle spindle. Where the axle tube mounting unit 37 is to be used with a hollow spindle axle of the Timkin or Clark types, a bushing having a bore diameter to accommodate the mounting unit must first be fitted in the bore of such axle at its outer end. It will thus be apparent that the axle hose assembly 12b, 12c, axle tube fitting 28 and plastic tubes 36 serve to conduct air under pressure from the outlet fitting 27 to the bore 44 of each of the axle tube mounting units 37.

To apply and maintain air under pressure in each of the tires mounted on the wheels 13, 13a, I have provided a novel rotating seal hub cap unit 46 and a wheel hose and tire valve assembly 47 as shown in FIG. 5.

The rotating seal hub cap unit 46 as shown consists of a hub cap body 48 having a base flange 49 for attachment to and rotation with a wheel 13, 13a by suitable bolts (not shown) adapted to extend through openings 50 in said flange and engage in said wheel body. The hub cap body 48 has an opening 51 in its top through which lubricant may be supplied to the interior of the hub cap and said top is normally closed by a filler plug 52. A rotating fluid-tight seal is provided between the rotatable hub cap and the stationary axle 12 by a stator assembly 53 carried by the axle and a seal ring 54 mounted in the hub cap. The stator assembly 53 consists of a flexible plastic and preferably frangible tubular element 55 of somewhat smaller outer diameter than the bore 44 in the tubular bushing 38 and the inner end of said plastic element 55 is provided with an elastomeric seal or O-ring 56 which engages the wall of said bore and at its outer end with an externally screw threaded portion to which is secured in a fluid-tight manner a tubular stator element 57 against the outer end face 57a of which the seal ring 54 is pressed by a spring 58. The stator element is concentric with a boss 59 extending inwardly from the inner side of the top of the hub cap and an anti-friction bearing 60 is interposed between said boss and said stator element to provide for rotation of the hub cap around the stator assembly. In the underside of the top of the hub cap there is provided a chamber 61, in communication with the bores through seal ring 54 and stator element 57 and extending from said chamber 61 diametrically outwardly are a pair of ducts 62 which terminate at their outer ends in screw threaded sockets 63. Mounted in each of the threaded sockets 63 in a fluid-tight manner is a swivel nut 64 connected to a nipple fitting 65 to which one end of a hose section 66 is connected and to the other end of said hose is connected a fitting 67 provided with a ball check valve 68 held upon its seat by a spring 69. Connected to the fitting 67 is a body and valve core assembly 70, which consists of a T-shape body member 71, the upright of the T-body being connected to the fitting 67 which houses a combined guide for the spring 69 and a ball stop 72. The cross-head of the T-body is formed as a tire valve casing within which is mounted a tire valve insides or core 73, the outer end of said tire valve casing having a valve cap 74 mounted thereon and the inner end of said casing having mounted thereon a swivel fitting 75 for providing a rigid fluid-tight seal with the valve stem of a tire (not shown) from which the valve core has been removed.

*Installation and operation*

The control box 16 is preferably located in the vicinity of the emergency air brake tank 14. The pressure regulator 19 controls the tire pressure while the pressure protection valve 17 prevents bleed down of the pressure in the air brake tank 14 below a predetermined pressure—say 60 p.s.i.—in the event of a broken hose, blowout, etc. The normally open pressure switch 23 is closed under air pressure which flows downstream from the protection valve 17 and the normally closed pressure switch 20, is held open until the pressure acting thereon falls to about 10 p.s.i. below normal tire pressure, hence if the pressure in any tire or between a tire and said pressure switch 20 drops 10 p.s.i. below normal pressure, the reduced pressure will permit switch 20 to close and cause the warning light 24 to flash. However, the emergency air brake tank 14 must be pressurized for the warning light to operate. This prevents the light from flashing when the trailer is parked without an air supply if there is leakage in the break or tire system. When the tractor is again started, and air is again made available in the emergency air brake tank, if the light flashes, a tire has lost pressure due to a slow leak or to damage to a wheel hose assembly or to damage to the stator assembly. The light will continue to flash until the damage is remedied or the tire is brought up to operating pressure which may take a little time because of the restricted outlet opening 18b in the adapter 18. The warning light 24 is usually mounted on the trailer to be visible in the driver's rear-view mirror 11a.

In the wheel hose assemblies 47 which connect the rotating seal hub caps with the tire valves, the ball check valves 68 permit air flow into the tires only and function to prevent tires other than the leaking one from losing any pressure. By providing each T-shaped body fitting 70 with a standard valve insides or core, normal servicing and taking a pressure reading of any tire is facilitated.

T.P.M.S. will maintain a pre-set equalized tire pressure in all tires and will replace air lost through slow leaks. A flashing warning light indicates a leakage exists that is greater than the system is able to replace. If the warning light flashes while the trailer is in operation, the following procedure should be followed:

(1) The operator of the vehicle should pull off the road and stop and determine the location of leakage; it will be audible;

(2) The air supply to the air brake tank should be shut off or the shut off valve 22, if included in installation, should be closed;

(3) If it is determined that leakage is other than from a tire, the operator should investigate for a hot bearing, loose wheel or broken hose;

(4) If the leak appears to be in a tire, the wheel hose assembly 47 should be removed from the rotating seal hub cap and both assemblies removed if the inner of a dual wheel is to be changed;

(5) The tire and rim should be removed from the wheel in the normal manner;

(6) The wheel hose assembly should be removed from the flat tire and attached to the valve of a new tire from which the valve core has been removed and then the hose assembly should be attached and the tire pressurized to 5 or 10 p.s.i. below normal operating pressure;

(7) The tire and rim should be mounted on the wheel in the normal manner and the valve stems positioned 180° apart where dual tires are employed;

(8) The wheel hose assemblies should be re-attached to the hub caps;

(9) And the air supply again connected to the brake tank whereupon the tire will automatically inflate to normal operating pressure.

If the warning light flashes when the trailer is coupled to tractor after overnight parking:

(a) If flashing period is brief, ignore it;

(b) If flashing continues for over one minute, a tire has gone flat or lost considerable pressure due to a slow leak. The tire pressures should be gauged since leakage may be too slow to be audible. The low pressure tire should be replaced.

From the foregoing detailed description of the T.P.M.S. and its installation and operation, it will be apparent that said system accomplishes all of the objects of the invention as set forth in the opening statement of this specification.

Although I have shown and described certain specific details of the T.P.M.S. installation, it will be understood that changes in such details and specific devices employed may be resorted to within the range of mechanical and engineering skill without departing from the spirit of the invention as hereinafter claimed.

What I claim is:

1. A tire pressure control system adapted to maintain a desired pressure in a plurality of tires mounted on the wheels of a vehicle and warn of underinflation of any of said tires, comprising a source of air at a pressure higher than the desired pressure to be maintained in the tires, means providing fluid connection in succession downstream from said pressure source to the tires, including a pressure regulator for limiting the air pressure to be supplied to the tires at said desired pressure, a pressure switch which closes when fluid pressure acting thereon is below a predetermined pressure lower than normal tire pressure and is held open above said predetermined lower pressure, conduits leading to hollow ends of the axles of the vehicle wheels, conduits connecting said hollow axle ends with the tires mounted on and rotatable with the wheels, each of said conduits having therein a check valve which opens at a predetermined pressure lower than normal tire pressure and closes under normal tire pressure acting thereon and an electrically controlled warning means operable by the pressure switch when the pressure in any of the tires falls below that at which the pressure switch closes.

2. A tire pressure control system adapted to maintain a desired pressure in a plurality of tires mounted on wheels of a vehicle and warn of underinflation of any of said tires, comprising a source of air at a pressure higher than the pressure to be maintained in the tires, means providing fluid connection in succession downstream from said pressure source to the tires including a pressure protection valve which permits air flow at a pressure higher than the pressure to be maintained in the tires, a normally open pressure switch which closes at the pressure that exits from the pressure protection valve, a pressure regulator for limiting the air pressure to be supplied to the tires, a normally closed pressure switch which is held open at and above a predetermined normal tire pressure and closes at a predetermined pressure lower than the normal tire pressure, conduits leading to a stationary axle having a through bore at a location intermediate its ends, a rotatable seal means between each end of the axle and a tire mounted on and rotatable with the wheels, each of said conduits having therein a check valve which opens at a predetermined pressure lower than normal tire pressure and closes under normal tire pressure acting thereon, and an electrically controlled warning means including electrical connections between said pressure switches whereby when the normally closed pressure switch is closed indicating that the pressure acting thereon is insufficient to maintain it open, the electrical circuit will close and operate the warning means.

3. A tire pressure control system adapted to maintain a desired pressure in a plurality of tires mounted on wheels of a vehicle and warn of underinflation of any of said tires, comprising a source of air at a pressure higher than the pressure to be maintained in the tires, means providing fluid connection in succession downstream from said pressure source to the tires including a pressure protection valve which permits air flow at a pressure higher than the pressure to be maintained in the tires, a normally open pressure switch which closes at the pressure that exits from the pressure protection valve, an adapter having a restricted orifice outlet, a pressure regulator connected to the adapter at the restricted orifice outlet for limiting the air pressure to be supplied to the tires, a normally closed pressure switch which is held open at and above a predetermined normal tire pressure, and closes at a predetermined pressure lower than the normal tire pressure, conduits leading to a bored end of a stationary axle, a rotatable seal means between the end of each axle and a tire mounted on and rotatable with the wheels, each of said conduits having therein a check valve which opens at a predetermined pressure lower than normal tire pressure and closes under normal tire pressure acting thereon, and an electrically controlled warning means including electrical connections between the pressure switches whereby when the normally closed pressure switch is closed indicating that the pressure acting thereon is insufficient to maintain it open, the electrical circuit will close and operate the warning means.

4. A tire pressure control system adapted for use in maintaining a desired pressure in a plurality of tires mounted on wheels of a trailer and warn of underinflation of any of the tires thereon, comprising a source of compressed air in excess of the brake system requirements and at a pressure higher than the pressure to be maintained in the tires, means providing fluid connection in succession downstream from said pressure source to the tires including a pressure protection valve which permits air flow at a pressure higher than the pressure to be maintained in the tires, a normally open pressure switch which closes at the pressure that exits from the pressure protection valve, an adapter having a restricted orifice outlet, a pressure regulator connected to the adapter at the restricted orifice outlet for limiting the air pressure to be supplied to the tires, a normally closed pressure switch which is held open at and above a predetermined normal tire pressure, and closes at a predetermined pressure lower than the normal tire pressure, conduits leading to a stationary axle having a through bore, at a location intermediate its ends, a rotatable hub cap enclosing each end of the axle, a rotatable seal means between the end of each axle and the interior of the hub cap, a conduit leading from the interior of each hub cap to a tire mounted on and rotatable with the wheels, each of said conduits having therein a check valve which opens at a predetermined pressure lower than normal tire pressure and closes under normal tire pressure acting thereon and an electrically controlled warning means including electrical connections between the pressure switches whereby when the normally closed pressure switch is closed because the pressure acting thereon is insufficient to maintain it open, the electrical circuit will close and operate the warning means.

5. A tire pressure control system according to claim 4, wherein a flexible frangible tubular member is interposed between each axle end and the rotatable seal means and provides fluid tight seals with said parts.

6. A tire pressure control system according to claim 4, wherein a thermoplastic tubular member is interposed between each axle end and the rotatable seal means and provides fluid tight seals with said parts.

7. A tire pressure control system according to claim 4 wherein the axle has dual tires mounted at each end of the axle and the hub cap has separate ducts leading outwardly therefrom and a separate conduit connecting each of said ducts with the tire valve of each of said dual tires.

8. A tire pressure control system according to claim 4, wherein the trailer is equipped with tandem stationary axles each having a through bore at a location intermediate its ends and conduits leading to each axle at said intermediate locations, a rotatable hub cap at each end of each axle and having a chamber in fluid communication with the open end of each adjacent axle thereto, a rotatable seal means between the end of each axle and its adjacent chamber and a conduit leading from each chamber to a tire valve.

9. In combination with a rotatable wheel having a stationary axle formed with an axial bore through an outer end thereof adapted for connection with a source of air under super atmospheric pressure rearwardly from said outer end of said bore, a rotatable seal hub cap unit mounted on said wheel comprising a hollow rotatable element and a hollow stator element having a protruding hollow tubular part which engages within the bored end of the axle with a fluid-tight fit, the hub cap unit having means for establishing fluid communication between the hollow rotatable element and a tire valve on the wheel.

10. The combination according to claim 9, wherein the adjacent ends of the hollow rotatable element and the hollow stator element are complementary and wherein means are provided for holding said ends in fluid-tight abutting relation.

11. The combination according to claim 9, wherein the protruding part of the hollow stator element is a thermoplastic tube.

12. The combination according to claim 9, wherein the protruding part of the hollow stator element is a flexible frangible tube.

13. For use with a tire pressure control system for maintaining a desired pressure in a plurality of tires mounted on the wheels of a vehicle, fluid coupling means for establishing fluid communication between a source of fluid under pressure and a through bore of a stationary axle having at a location intermediate its ends, said fluid coupling means comprising a hole through the axle body at said location, a flexible tube extending from each end of the axle through said bore and projecting through said hole, a grommet of elastomeric material closing said hole and having openings through which the adjacent ends of the tubes extend and a body member having a chamber within which the free ends of said tube ends terminate, said body member being secured to the axle and provide a fluid-tight seal with the grommet and also having a port leading from said chamber adapted for connection with the source of fluid under pressure.

14. Fluid coupling means according to claim 13, wherein a washer having spaced openings through which the adjacent ends of the tubes extend is interposed between the grommet and the axle at the location of the hole in the axle body.

References Cited by the Examiner

UNITED STATES PATENTS

| | | | |
|---|---|---|---|
| 2,190,117 | 2/1940 | Griffith | 152—415 |
| 2,715,430 | 8/1955 | Lindeman | 152—417 |
| 2,931,414 | 4/1960 | Jankowski | 152—417 |

ARTHUR L. LA POINT, *Primary Examiner.*

C. W. HAEFELE, *Assistant Examiner.*